United States Patent
Hur et al.

(10) Patent No.: US 11,139,733 B2
(45) Date of Patent: Oct. 5, 2021

(54) MODULAR MULTILEVEL CONVERTER SUB-MODULE HAVING DC FAULT CURRENT BLOCKING FUNCTION AND METHOD OF CONTROLLING THE SAME

(71) Applicant: Industry-Academic Cooperation Foundation, Yonsei University, Seoul (KR)

(72) Inventors: Kyeon Hur, Seoul (KR); Heejin Kim, Seoul (KR); Sangmin Kim, Seoul (KR); Jongseo Na, Seoul (KR); Ryangkyu Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 16/844,447

(22) Filed: Apr. 9, 2020

(65) Prior Publication Data
US 2020/0366186 A1     Nov. 19, 2020

(30) Foreign Application Priority Data
May 14, 2019 (KR) .......................... 10-2019-0056530

(51) Int. Cl.
*H02M 1/32* (2007.01)
*H02M 7/483* (2007.01)

(52) U.S. Cl.
CPC ............. *H02M 1/32* (2013.01); *H02M 7/483* (2013.01); *H02M 1/322* (2021.05); *H02M 1/325* (2021.05); *H02M 7/4835* (2021.05)

(58) Field of Classification Search
CPC .......... H02M 7/483; H02M 2001/322; H02M 2001/325; H02M 1/32; H02M 2007/4835
See application file for complete search history.

(56) References Cited

U.S. PATENT DOCUMENTS

2016/0013716 A1*   1/2016 Hur .................. H02M 1/32
                                                  363/50

FOREIGN PATENT DOCUMENTS

KR   10-2014-0022374 A    2/2014
KR   10-1389579 B1        4/2014
(Continued)

OTHER PUBLICATIONS

Korean Office Action for related KR Application No. 10-2019-0056530 dated May 8, 2020 from Korean Patent Office.
(Continued)

*Primary Examiner* — Jue Zhang
(74) *Attorney, Agent, or Firm* — Paratus Law Group, PLLC

(57) ABSTRACT

Disclosed is a modular multilevel converter sub-module, including: a normal circuit which includes a first switching element and a second switching element connected in series and a first diode and a second diode respectively connected to be parallel to the first switching element and the second switching element to offset a counter electromotive force generated in the first switching element and the second switching element, a fault DC current blocking circuit which includes a capacitor connected to the normal circuit in parallel and applies a capacitor voltage to a DC fault path as a reverse voltage with respect to a fault voltage, and a bypass circuit which includes a third switch element, is connected to the fault DC current blocking circuit in parallel, and determines an output voltage and a direction of an arm current to provide a DC fault current bypass path when a DC fault current occurs.

14 Claims, 8 Drawing Sheets

(56) References Cited

FOREIGN PATENT DOCUMENTS

| | | |
|---|---|---|
| KR | 10-1542940 B1 | 8/2015 |
| KR | 10-2016-0060829 A | 5/2016 |
| KR | 10-2017-0079613 A | 7/2017 |
| KR | 10-2017-0083317 A | 7/2017 |

OTHER PUBLICATIONS

Korean Notice of Allowance for related KR Application No. 10-2019-0056530 dated Nov. 20, 2020 from Korean Patent Office.

* cited by examiner

Thyristor only

Thyristor & IGBT

Thyristor only

Thyristor & IGBT

MODULAR MULTILEVEL CONVERTER SUB-MODULE HAVING DC FAULT CURRENT BLOCKING FUNCTION AND METHOD OF CONTROLLING THE SAME

CROSS-REFERENCE TO RELATED APPLICATION

This application claims priority to and the benefit of Korean Patent Application No. 10-2019-0056530, filed on May 14, 2019, the disclosure of which is incorporated herein by reference in its entirety.

BACKGROUND

The present invention relates to a modular multilevel converter, and more particularly, to a modular multilevel converter sub-module having a DC fault current blocking function, in which a DC fault current bypass path is provided, thereby suppressing damage to an element of a sub-module, and a method of controlling the same.

A modular multilevel converter (MMC) is a type of multilevel converter and is a converter which includes a plurality of sub-modules (SM).

Such an MMC may exhibit a high voltage output and a large capacity output of a multi-converter and may adjust the output voltage with stepped outputs.

The MMC has advantages in that the MMC is easy to implement due to a structure thereof being simpler than that of a general multilevel converter and extra SMs are used to further extend a lifespan thereof.

In the case of the above-described MMC, a power semiconductor circuit includes a plurality of SMs forming two output terminals, and the plurality of SMs are connected in series.

Each SM includes, for example, an energy storage unit and a power semiconductor.

The power semiconductor may include a power semiconductor switch and a free wheeling diode and may be implemented using, for example, an insulated gate bipolar transistor (IGBT). In the SM, a plurality of power semiconductors are connected in series to form a so-called half bridge or full bridge circuit.

In addition, two output terminals of the SMs of the MMC output one of a voltage, a zero voltage, and a polarity-reversed voltage of the energy storage unit.

FIGS. 1A and 1B are configuration diagrams illustrating a configuration of a half bridge SM and a current path when a fault occurs. FIGS. 2A and 2B are configuration diagrams illustrating a configuration of a full bridge SM and a current path when a fault occurs.

An MMC according to the related art includes a half bridge SM, a full bridge SM, or a combination of a half bridge SM and a full bridge SM.

However, the MMC including the half bridge SM has a problem in that there is no direct current (DC) fault current blocking function, and the MMC including the full bridge SM may block a DC fault current but has a problem in that loss is significantly increased during a normal operation.

Therefore, a half bridge and a full bridge are used at the same time to relatively reduce loss and also provide a DC fault current blocking capability.

In this case, when a DC fault occurs, a current is blocked by a reverse voltage of a capacitor of an SM, but there is a problem in that conduction loss is increased due to an additional path of an IGBT and a diode in a normal state.

As described above, in the MMC according to the related art, when a DC fault occurs, a high current flows through a diode due to a large potential difference between an alternating current (AC) connection point and a DC connection point.

In order to prevent such a DC fault current, a separate DC circuit breaker or the like is being developed, but unlike an AC current, the DC fault current has no zero crossing point, and thus it is difficult to remove and block the fault current.

As described above, in the MMC, since a voltage is generated by controlling a plurality of modules to turn on or off, switching loss and harmonic generation are low as compared with other voltage-type power converters.

In addition, since it is easy to expand a voltage and a capacity, the MMC is core technology for a high voltage DC system for high voltage/high power transmission.

However, according to an SM constituting an MMC, a half bridge MMC has a problem in that a DC fault current is difficult to block, and a full bridge MMC may block a DC fault current but has a problem in that loss is significantly increased during normal operation.

Therefore, there is a need for a configuration topology of a new MMC system having a DC fault response capability and a low loss characteristic.

RELATED ART DOCUMENTS

Patent Documents (Patent Document 1) Korean Patent Laid-Open Publication No. 10-2014-0022374 (Patent Document 2) Korean Patent Laid-Open Publication No. 10-2017-0083317 (Patent Document 3) Korean Patent Laid-Open Publication No. 10-2017-0079613

SUMMARY

The present invention is directed to providing a modular multilevel converter sub-module having a direct current (DC) fault current blocking function, in which a DC fault current bypass path is provided, thereby suppressing damage to an element of a sub-module, and a method of controlling the same.

The present invention is directed to providing a modular multilevel converter sub-module having a DC fault current blocking function, in which a sub-module (SM) is provided with a module including one insulated gate bipolar transistor (IGBT), two diodes, and one thyristor and providing a DC fault current bypass path, thereby reducing a DC fault current inside an arm of a modular multilevel converter, and a method of controlling the same.

The present invention is directed to providing a modular multilevel converter sub-module having a DC fault current blocking function, in which, when a DC fault occurs, a reverse voltage may be supplied to block a DC fault current, thereby preventing damage to an IGBT, a diode, and a capacitor, and a voltage of the capacitor may be prevented from being discharged, thereby allowing quick restarting to be possible after removal of the DC fault, and a method of controlling the same.

The present invention is directed to providing a modular multilevel converter sub-module having a DC fault current blocking function, in which, as compared with an arm including a full bridge-type module having a DC fault current reducing function, which includes four IGBTs, four diodes, and one capacitor, during a normal state operation, an arm current may flow to a thyristor having low conduction loss instead of an IGBT having high conduction loss, thereby reducing conduction loss, and a method of controlling the same.

The present invention is directed to providing a modular multilevel converter sub-module having a DC fault current blocking function, in which, since a capacitor voltage of a sub-module is applied to a fault current path as a reverse voltage with respect to a voltage caused by a fault through operations of an IGBT and a thyristor during a DC fault, a potential difference between an alternating current (AC) connection point and a DC connection point may be rapidly reduced, thereby preventing a DC fault current from flowing, and a method of controlling the same.

Objects of the present invention are not limited to the foregoing objects and any other objects not mentioned herein may be clearly understood by a person skilled in the art from the present invention described hereinafter.

According to an aspect of the present invention, there is provided a modular multilevel converter sub-module having a direct current (DC) fault current blocking function including a normal circuit which includes a first switching element (T1) and a second switching element (T2) connected in series to control the modular multilevel converter sub-module to turn on or off through an on or off operation and a first diode (D1) and a second diode (D2) respectively connected to be parallel to the first switching element (T1) and the second switching element (T2) to offset a counter electromotive force generated in the first switching element (T1) and the second switching element (T2), a fault DC current blocking circuit which includes a capacitor (C) connected to the normal circuit in parallel and applies a capacitor voltage ($V_{cap}$) to a DC fault path as a reverse voltage ($V_{Block}$) with respect to a fault voltage ($V_{Fault}$), and a bypass circuit which includes a third switch element (T3), is connected to the fault DC current blocking circuit in parallel, and determines an output voltage ($V_{SM}$) and a direction of an arm current ($i_{ARM}$) to provide a DC fault current bypass path when a DC fault current occurs.

The bypass circuit may include the third switching element (T3), a third diode (D3), a thyristor (TH3), and a fourth diode (D4), wherein the third switching element (T3), the third diode (D3), and the thyristor (TH3) are connected in parallel and connected to the fourth diode (D4), which is connected to the first switching element (T1), in series to form a fault DC current path.

The first switching element (T1), the second switching element (T2), and the third switching element (T3) may each include an insulated gate bipolar transistor (IGBT).

In a case in which the direction of the arm current ($i_{ARM}$) in a normal operation is positive ($i_{ARM}$>0), a current may always flow through the third diode (D3) of the bypass circuit, when the first switching element (T1) is switched on, a current may flow to the first diode (D1), and the capacitor voltage ($V_{cap}$) of the fault DC current blocking circuit may be output, and when the second switching element (T2) is switched on, a current may flow to the second switching element (T2), and a sub-module voltage may become zero.

In a case in which the direction of the arm current $i_{ARM}$ in a normal operation is positive ($i_{ARM}$>0), when the modular multilevel converter sub-module is turned on, the modular multilevel converter sub-module may have a switching state in which the first switching element (T1) is switched on, the second switching element (T2) is switched off, the third switching element (T3) is switched off, and the thyristor (TH3) is switched off, and when the modular multilevel converter sub-module is turned off, the modular multilevel converter sub-module may have a switching state in which the first switching element (T1) is switched off, the second switching element (T2) is switched on, the third switching element (T3) is switched off, and the thyristor (TH3) is switched off.

In a case in which the direction of the arm current ($i_{ARM}$) in a normal operation is negative ($i_{ARM}$<0), a current may flow through the third switching element (T3) and the thyristor (TH3), when the first switching element (T1) is switched on, a current may flow to the first switching element (T1), and the capacitor voltage ($V_{cap}$) of the fault DC current blocking circuit may be output, and when the second switching element (T2) is switched on, a current may flow to the second diode (D2), and a sub-module voltage may become zero.

In a case in which the direction of the arm current $i_{ARM}$ in a normal operation is negative ($i_{ARM}$<0), when the modular multilevel converter sub-module is turned on, the modular multilevel converter sub-module may have a switching state in which the first switching element (T1) is switched on, the second switching element (T2) is switched off, the third switching element (T3) is switched on, and the thyristor (TH3) is switched on, and when the modular multilevel converter sub-module is turned off, the modular multilevel converter sub-module may have a switching state in which the first switching element (T1) is switched off, the second switching element (T2) is switched on, the third switching element (T3) is switched on, and the thyristor (TH3) is switched on.

During a fault operation, a current may flow in a negative direction ($i_{Fault}$<0), and when the third switching element (T3) and the thyristor (TH3) are switched off during a fault, a current may flow to the fourth diode (D4) and the second diode (D2) so that the capacitor voltage ($V_{cap}$) is applied to the DC fault path as the reverse voltage ($V_{Block}$) with respect to the fault voltage ($V_{Fault}$) to block a fault DC current.

During a fault operation, the modular multilevel converter sub-module may have a switching state in which the first switching element (T1) is switched off, the second switching element (T2) is switched off, the third switching element (T3) is switched off, and the thyristor (TH3) is switched off.

According to another aspect of the present invention, there is provided a method of controlling a modular multilevel converter sub-module having a direct current (DC) fault current blocking function, which includes a normal circuit which includes a first switching element (T1) and a second switching element (T2) connected in series to control the modular multilevel converter sub-module to turn on or off through an on or off operation and a first diode (D1) and a second diode (D2) respectively connected to be parallel to the first switching element (T1) and the second switching element (T2) to offset a counter electromotive force generated in the first switching element (T1) and the second switching element (T2), a fault DC current blocking circuit which includes a capacitor (C) connected to the normal circuit in parallel and applies a capacitor voltage ($V_{cap}$) to a DC fault path as a reverse voltage ($V_{Block}$) with respect to a fault voltage ($V_{Fault}$), and a bypass circuit which includes a third switching element (T3), a third diode (D3), a thyristor (TH3), and a fourth diode (D4), wherein the third switching element (T3), the third diode (D3), and the thyristor (TH3) are connected in parallel and are connected to the fourth diode (D4), which is to the first switching element (T1), in series to form a fault DC current path, the method including, when a fault occurs, switching the third switching element (T3) and the thyristor (TH3) off to allow a current to flow to the fourth diode (D4) and the second diode (D2) and applying the capacitor voltage ($V_{cap}$) to the DC fault path as the reverse voltage ($V_{block}$) with respect to the fault voltage ($V_{Fault}$) to block a fault DC current.

When the fault occurs, the modular multilevel converter sub-module may have a switching state in which the first switching element (T1) is switched off, the second switching element (T2) is switched off, the third switching element (T3) is switched off, and the thyristor (TH3) is switched off.

A modular multilevel converter may include an upper arm and a lower arm which include the modular multilevel converter sub-modules, the third switching element (T3) and the thyristor (TH3) of the modular multilevel converter sub-module of the upper arm may be installed in a negative direction to provide a path with respect to a negative upper arm current, and just before the upper arm current becomes negative, the third switching element (T3) of the upper arm may be switched on so that a current flows.

In order to prevent a diode loop path from being generated due to a current flowing to the thyristor (TH3) of the modular multilevel converter sub-module of the upper arm and the thyristor (TH3) of the lower arm when a DC fault current occurs, while a lower arm current flows in the thyristor (TH3) of the modular multilevel converter sub-module, the upper arm current may flow in the third switching element (T3) to allow a fault current to be blocked through a switch-off operation thereof.

The lower arm current may not flow to the thyristor (TH3) of the modular multilevel converter sub-module of the lower arm from a lower arm current zero crossing point at which the lower arm current becomes positive, and the upper arm current may flow to the thyristor (TH3) of the upper arm.

After a certain time delay for a margin at the lower arm current zero crossing point, when the thyristor (TH3) of the modular multilevel converter sub-module of the upper arm is switched on, the upper arm current may flow to the thyristor (TH3) instead of the third switching element (T3) of the modular multilevel converter sub-module to reduce conduction loss.

DETAILED DESCRIPTION

Hereinafter, exemplary embodiments of a modular multilevel converter sub-module having a direct current (DC) fault current blocking function and a method of controlling the same according to the present invention will be described in detail.

The features and advantages of the modular multilevel converter sub-module having a DC fault current blocking function and the method of controlling the same according to the present invention will be apparent through the following detailed descriptions of the exemplary embodiments.

Figure 1A:
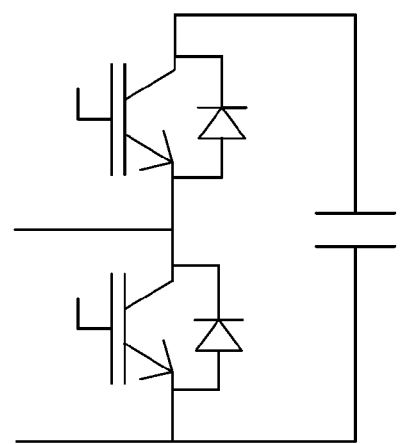
FIGS. 1A and 1B are configuration diagrams illustrating a configuration of a half bridge sub-module and a current path when a fault occurs.
Figure 1B:
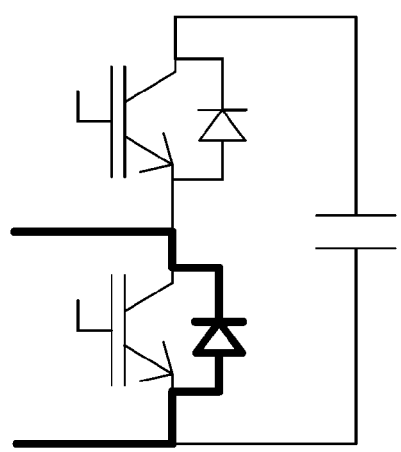
Figure 2A:
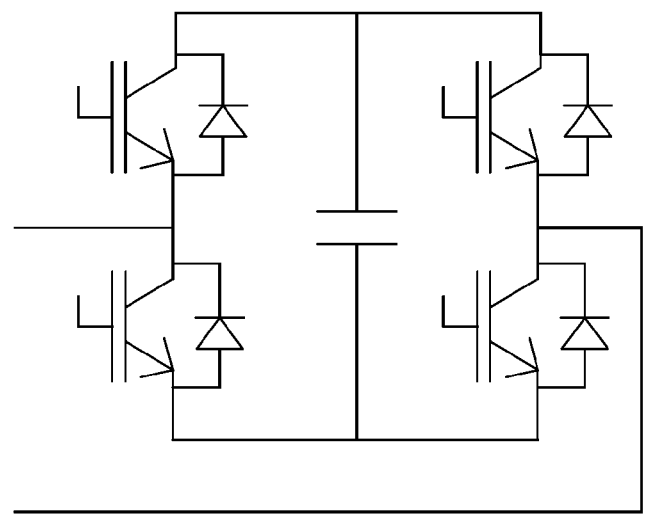
FIGS. 2A and 2B are configuration diagrams illustrating a configuration of a full bridge sub-module and a current path when a fault occurs.
Figure 2B:
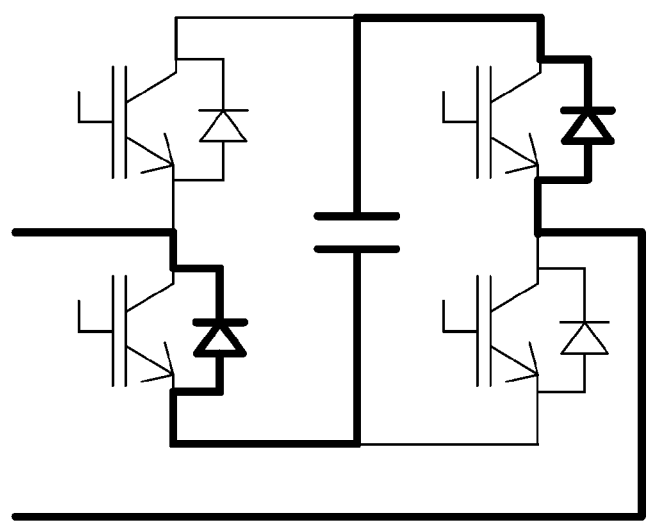
Figure 3A:
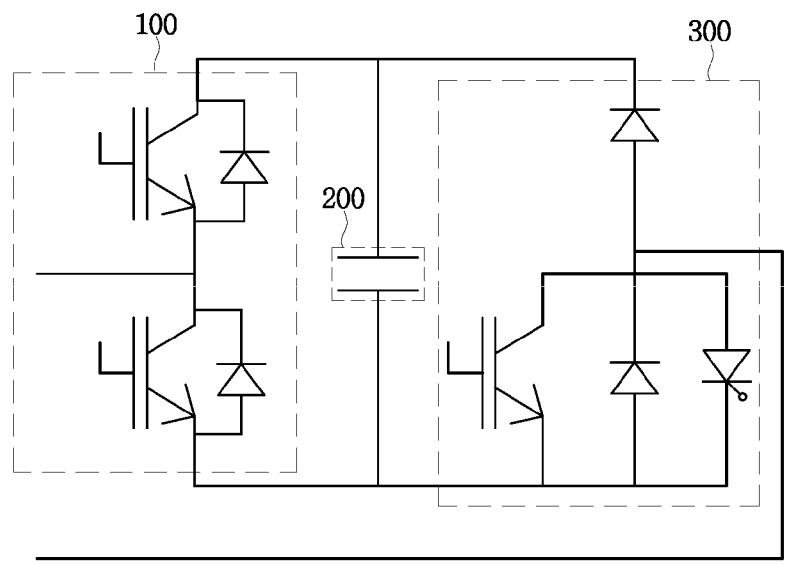
FIGS. 3A and 3B are configuration diagrams illustrating a configuration of a sub-module according to the present invention and a current path when a fault occurs.
Figure 3B:
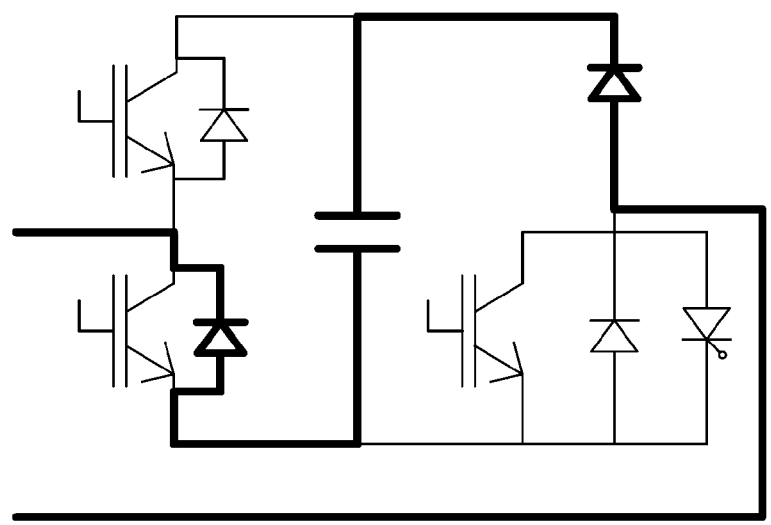

FIGS. 3A and 3B are configuration diagrams illustrating a configuration of a sub-module according to the present invention and a current path when a fault occurs.

The modular multilevel converter sub-module having a DC fault current blocking function and the method of controlling the same according to the present invention are directed to providing a sub-module having a configuration capable of blocking a fault current on a DC line of a modular multilevel converter high voltage DC (HVDC) system.

The sub-module includes a switching part (including an insulated gate bipolar transistor (IGBT), a thyristor, and a diode) which may have low conduction loss during a normal state and may determine a path of a DC fault current during a fault.

According to the modular multilevel converter sub-module having a DC fault current blocking function according to the present invention, which has such a configuration, when a DC fault occurs, as in a full bridge sub-module, a DC fault current is blocked by a reverse voltage of a capacitor, and in a normal state, most of the current flows to the thyristor having conduction loss characteristic lower than that of the IGBT, thereby reducing conduction loss as compared with a full bridge.

Referring to FIGS. 3A and 3B, during a normal operation, an initial current flows to the IGBT, and then, most of the current flows to the thyristor having low conduction loss. Thus, when a fault occurs, a switch of the IGBT may be switched off to allow a DC fault current to pass through a sub-module capacitor, thereby reducing a fault current.

The modular multilevel converter sub-module having a DC fault current blocking function according to the present invention has the following configuration.

Figure 4:
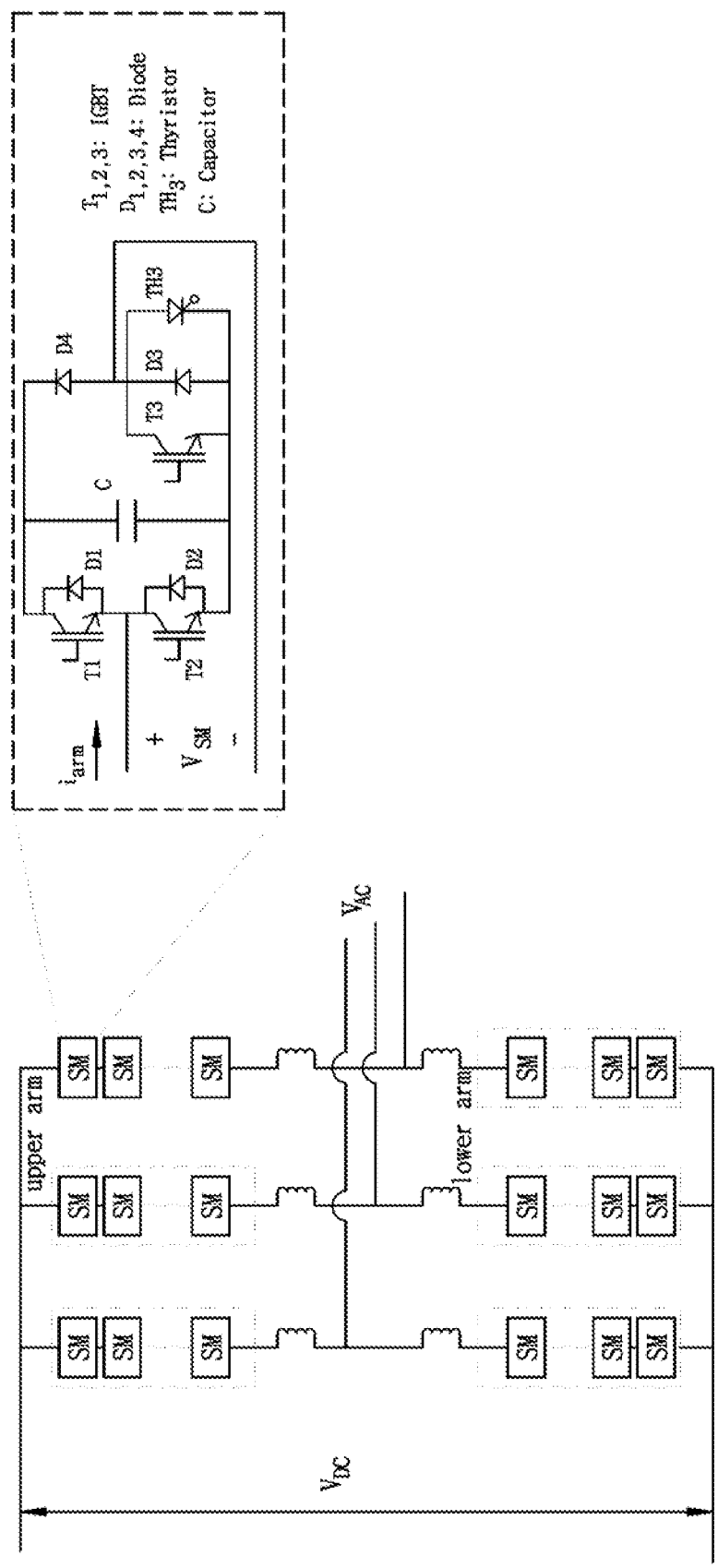
FIG. 4 is a detailed block diagram of a modular multilevel converter sub-module having a direct current (DC) fault current blocking function according to the present invention.

FIG. 4 is a detailed block diagram of the modular multilevel converter sub-module having a DC fault current blocking function according to the present invention.

As shown in FIG. 4, a modular multilevel converter includes a plurality of legs and a plurality of arms, and each arm includes a plurality of sub-modules SM.

The arms may include upper arms and lower arms, which each include the sub-modules.

As described above, the sub-module constituting the arm includes a normal circuit 100 which includes first and second switching elements T1 and T2 connected in series to control the sub-module to turn on or off through on/off operations and first and second diodes D2 and D2 respectively connected to be parallel to the first and second switching elements T1 and T2 to offset a counter electromotive force generated in the first and second switching elements T1 and T2, a fault DC current blocking circuit 200 which includes a capacitor C connected to the normal circuit 100 in parallel and applies a capacitor voltage $V_{cap}$ to a DC fault path as a reverse voltage $V_{Block}$ with respect to a fault voltage $V_{Fault}$, and a bypass circuit 300 which is connected to the fault DC current blocking circuit 200 in parallel and determines an output voltage $V_{SM}$ and a direction of a current $i_{ARM}$ to provide a DC fault current bypass path when a DC fault current occurs.

Here, the bypass circuit 300 includes one IGBT, two diodes, and one thyristor to provide the DC fault current bypass path. The bypass circuit 300 includes a third switching element T3, a third diode D3, a thyristor TH3, and a fourth diode D4. The third switching element T3, the third diode D3, and the thyristor TH3 are connected in parallel and connected to the fourth diode D4, which is connected to the first switching element T1, in series to form a fault DC current path.

Here, the first, second, and third switching elements T1, T2, and T3 may include IGBTs.

According to the sub-module according to the present invention, which has such a configuration, it is possible to reduce a DC fault current inside an arm of a modular multilevel converter.

When a DC fault occurs, the fault DC current blocking circuit 200 may provide a reverse voltage to block a DC fault current, thereby preventing damage to the IGBT, the diode, and the capacitor. In addition, since a voltage of the capacitor is prevented from being discharged, quick restarting is possible after removal of the DC fault.

A method of controlling the above-described modular multilevel converter sub-module having a DC fault current blocking function and a process of operating the modular multilevel converter sub-module according to the present invention will be described.

Figure 5:
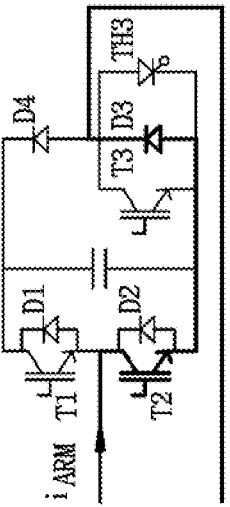
FIG. 5 is a configuration diagram of a current flow of the sub-module when a direction of an arm current ($i_{ARM}$) during a normal operation is positive.

FIG. 5 is a configuration diagram of a current flow of the sub-module when a direction of an arm current $i_{ARM}$ during a normal operation is positive.

When the direction of the arm current $i_{ARM}$ during the normal operation is positive ($i_{ARM}>0$), a current always flows through the third diode D3.

When the first switching element T1 is switched on, a current flows to a first diode D1, and the capacitor voltage $V_{cap}$ of the fault DC current blocking circuit 200 is output.

When the second switching element T2 is switched on, a current flows to the second switching element T2, and a sub-module voltage becomes zero.

As described above, in a case in which the direction of the arm current $i_{ARM}$ during the normal operation is positive ($i_{ARM}>0$), when the sub-module is turned on, the sub-module has a switching state in which the first switching element T1 is switched on, the second switching element T2 is switched off, the third switching element T3 is switched off, and the thyristor TH3 is switched off.

When the sub-module is turned off, the sub-module has a switching state in which the first switching element T1 is switched off, the second switching element T2 is switched on, the third switching element T3 is switched off, and the thyristor TH3 is switched off.

Figure 6:
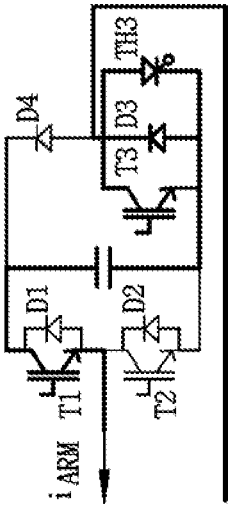
FIG. 6 is a configuration diagram of a current flow of the sub-module when a direction of an arm current ($i_{ARM}$) during a normal operation is negative.

FIG. 6 is a configuration diagram of a current flow of the sub-module when a direction of an arm current $i_{ARM}$ during a normal operation is negative.

When the direction of the arm current $i_{ARM}$ during the normal operation is negative, a current flows through the third switching element T3 and the thyristor TH3.

The third switching element T3 is switched on at the beginning, and after a certain time delay, the thyristor TH3 is switched on and thus a current flows to the thyristor TH3.

When the first switching element T1 is switched on, a current flows to the first switching element T1, and the capacitor voltage $V_{cap}$ of the fault DC current blocking circuit 200 is output.

When the second switching element T2 is switched on, a current flows to the second diode D2, and a sub-module voltage becomes zero.

As described above, in a case in which the direction of the arm current $i_{ARM}$ during the normal operation is negative ($i_{ARM}<0$), when the sub-module is turned on, the sub-module has a switching state in which the first switching element T1 is switched on, the second switching element T2 is switched off, the third switching element T3 is switched on, and the thyristor TH3 is switched on.

When the sub-module is turned off, the sub-module has a switching state in which the first switching element T1 is switched off, the second switching element T2 is switched on, the third switching element T3 is switched on, and the thyristor TH3 is switched on.

Figure 7:
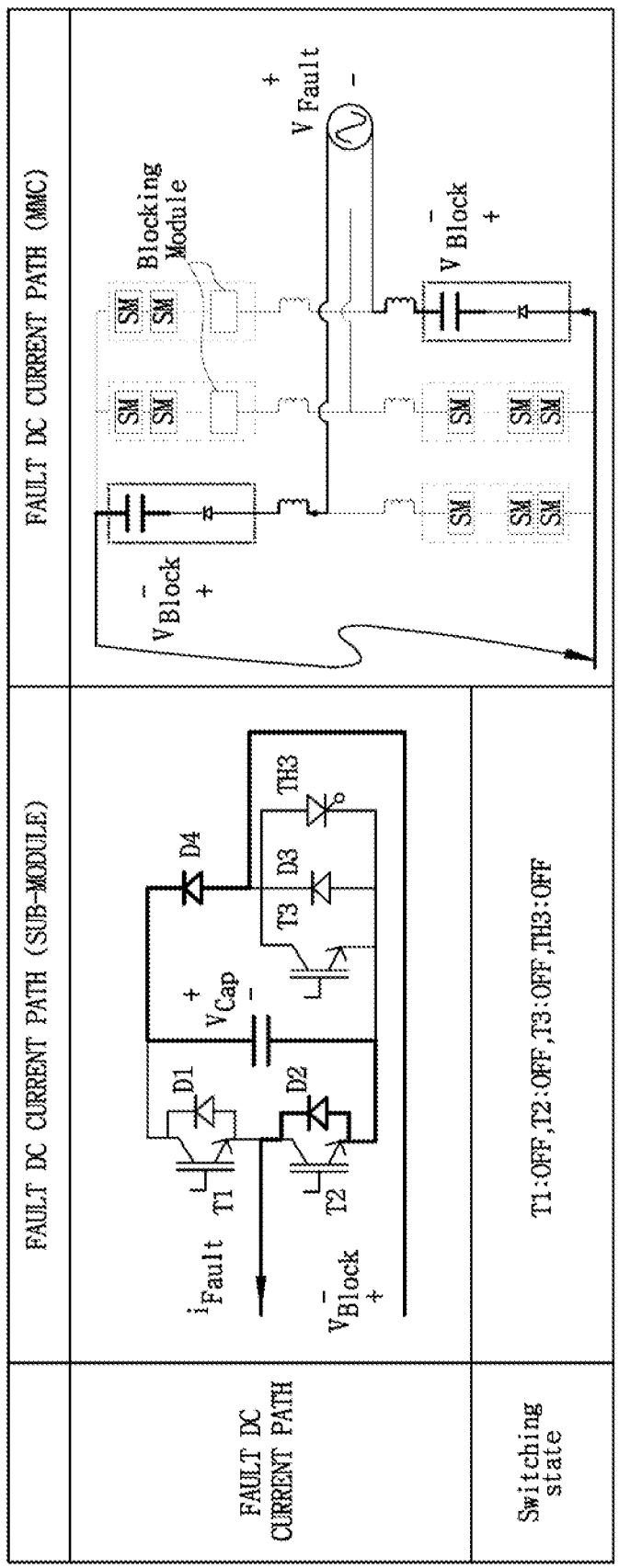
FIG. 7 is a configuration diagram of a current flow of the sub-module during a fault operation.

FIG. 7 is a configuration diagram of a current flow of the sub-module during a fault operation.

During the fault operation, a current flows in a negative direction ($i_{Fault}<0$).

When the third switching element T3 and the thyristor TH3 are switched off during a fault, a current flows to the fourth diode D4 and the second diode D2.

That is, the capacitor voltage $V_{cap}$ may be applied to a DC fault path as the reverse voltage $V_{Block}$ with respect to the fault voltage $V_{Fault}$, thereby blocking a fault DC current.

During the fault operation, the sub-module has a switching state in which the first switching element T1 is switched off, the second switching element T2 is switched off, the third switching element T3 is switched off, and the thyristor TH3 is switched off.

Figure 8:
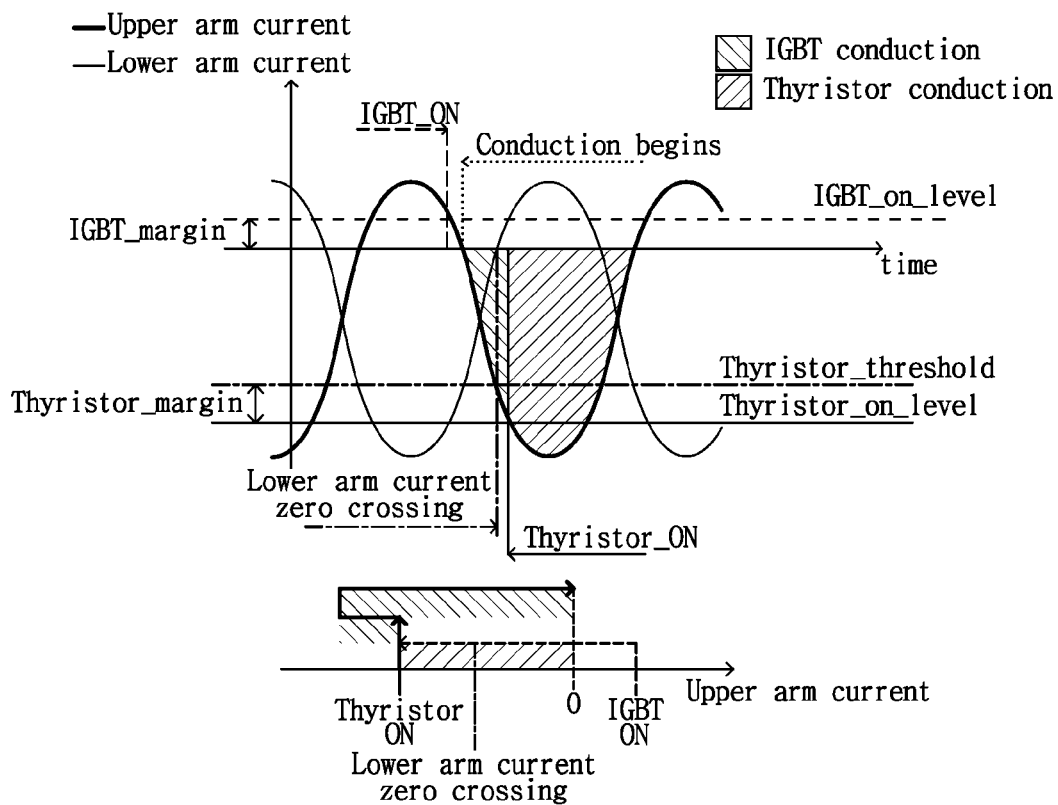
FIG. 8 is an operation waveform diagram illustrating a method of controlling a modular multilevel converter sub-module having a DC fault current blocking function according to the present invention.
Figure 9:
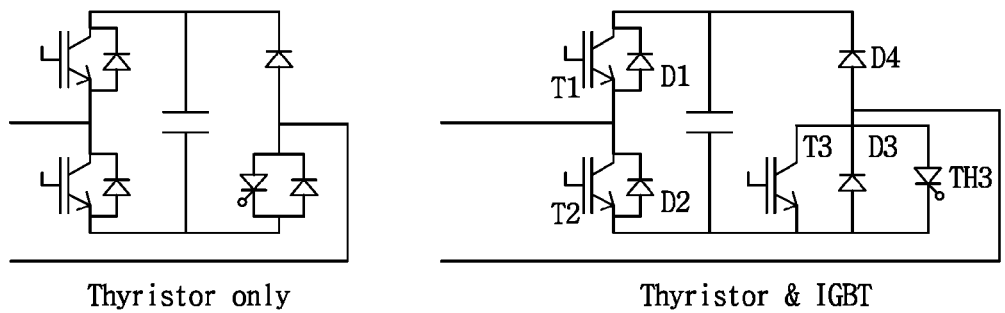
FIGS. 9 and 10 show configurations and operation waveform comparison graphs of a sub-module including a thyristor and a sub-module including a thyristor and an IGBT.
Figure 10:
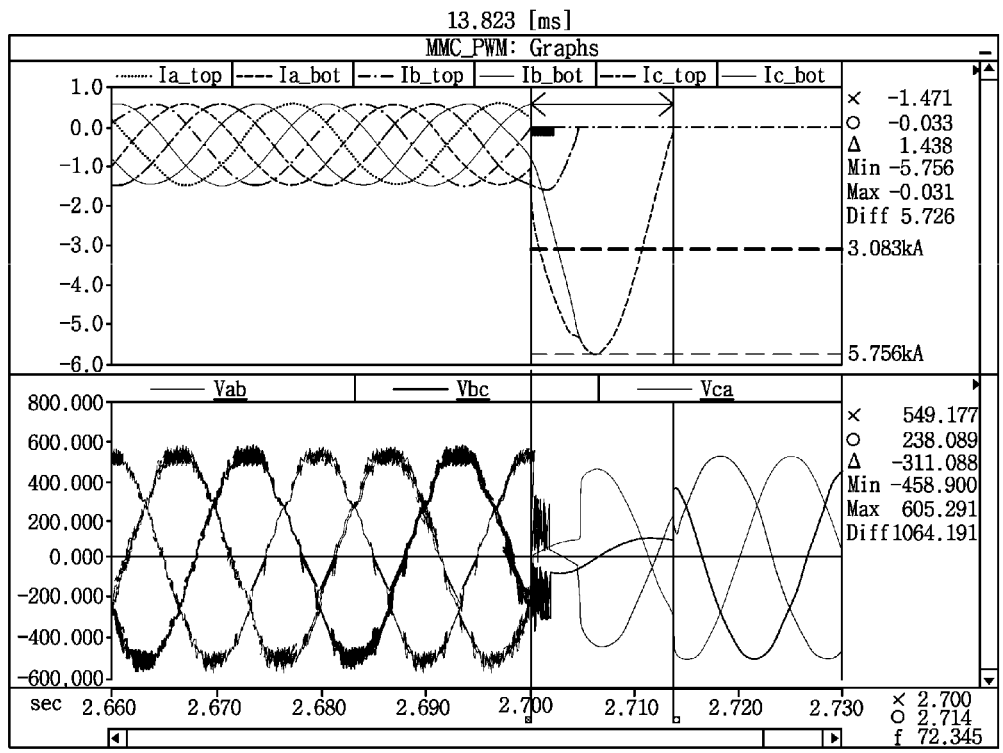
Figure 10:
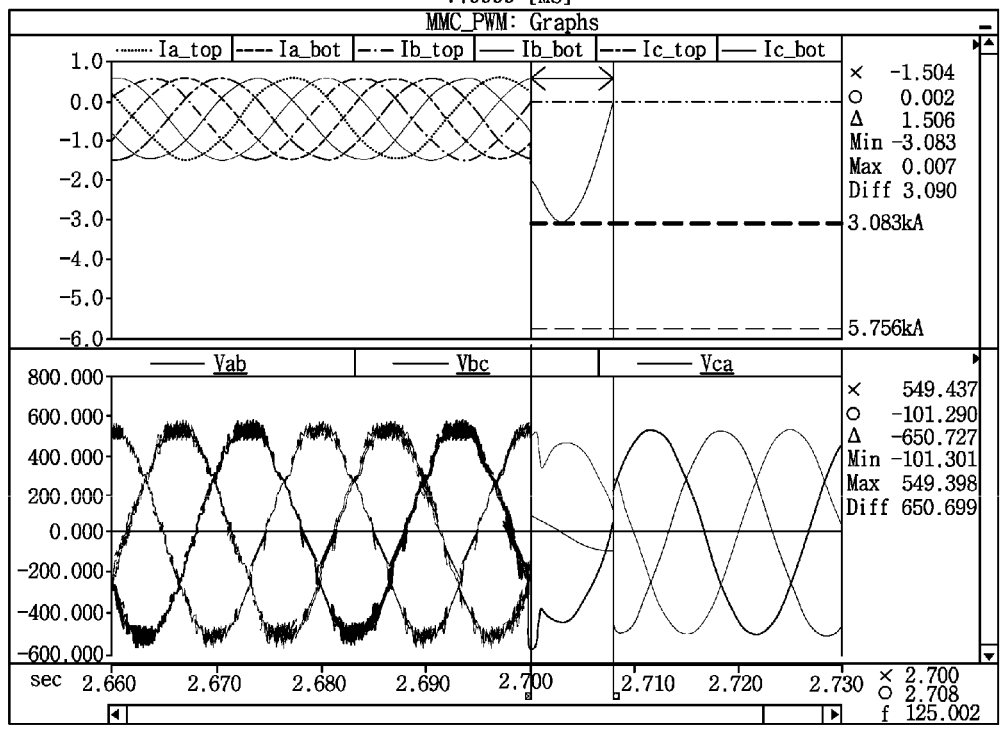

FIG. 8 is an operation waveform diagram illustrating the method of controlling the modular multilevel converter sub-module having a DC fault current blocking function according to the present invention. FIGS. 9 and 10 show configurations and operation waveform comparison graphs of a sub-module including a thyristor and a sub-module including a thyristor and an IGBT.

The method of controlling the modular multilevel converter sub-module having a DC fault current blocking function according to the present invention will be described with reference to FIG. 8.

Based on the upper arm, the third switching element T3 and the thyristor TH3 of the sub-module of the upper arm are installed in a negative direction to provide a path with respect to a negative upper arm current.

Just before the upper arm current becomes negative, the third switching element T3 of the upper arm is switched on such that a current flows.

When a DC fault current occurs and a current flows to the thyristor TH3 of the sub-module of the upper arm and the thyristor TH3 of the lower arm, a diode loop path is generated. In this case, since the thyristor has no off-function, it is difficult to prevent a fault current.

In order to prevent the diode loop path from being generated, the upper arm current should flow in the third switching element T3 while a lower arm current flows in the thyristor TH3.

The switching element T3 may be switched off when a fault occurs so that a fault current may be blocked.

Since the lower arm current does not flow to the thyristor TH3 of the lower arm from a lower arm current zero crossing point at which the lower arm current becomes positive, the upper arm current may flow to the thyristor TH3 of the upper arm.

After a certain time delay for a slight margin at the lower arm current zero crossing point, when the thyristor TH3 of the sub-module of the upper arm is switched on, the upper arm current flows to the thyristor TH3 instead of the third switching element T3.

From this time, since the upper arm current flows to the thyristor TH3 of the upper arm instead of the third switching element T3 of the sub-module of the upper arm, conduction loss is relatively reduced.

As described above, according to the modular multilevel converter sub-module having a DC fault current blocking function and the method of controlling the same according to the present invention, since a capacitor voltage of a sub-module is applied to a fault current path as a reverse voltage with respect to a voltage caused by a fault through operations of an IGBT and a thyristor during a DC fault, a potential difference between an alternating current (AC) connection point and a DC connection point may be rapidly reduced, thereby preventing a DC fault current from flowing.

As compared with an arm including a full bridge-type module having a DC fault current reducing function, which includes four IGBTs, four diodes, and one capacitor, during a normal operation, an arm current may flow to a thyristor having a low conduction loss characteristic instead of an IGBT having a high conduction loss characteristic, thereby reducing conduction loss.

According to the modular multilevel converter sub-module having a DC fault current blocking function and the method of controlling the same according to the present invention as described above, a DC fault current bypass path may be provided to suppress damage to an element of a sub-module.

Problems may be solved using a full bridge-type sub-module, but in this case, since an additional IGBT path is generated during a normal state operation, loss is increased by 30% or more as compared with a conventional half bridge sub-module.

However, according to the modular multilevel converter sub-module having a DC fault current blocking function and the method of controlling the same according to the present invention, since a normal state operation current flows to a thyristor having a conduction loss characteristic lower than that of an IGBT, conduction loss may be reduced, and a fault current may also be efficiently blocked during a DC fault.

As described above, the modular multilevel converter sub-module having a DC fault current blocking function and the method of controlling the same according to the present invention have the following effects.

First, a module for providing a DC fault current bypass path is added to a modular multilevel converter sub-module, thereby suppressing damage to an element of a sub-module.

Second, a sub-module SM is provided with a module including one IGBT, two diodes, and one thyristor and providing a DC fault current bypass path, thereby reducing a DC fault current inside an arm of a modular multilevel converter.

Third, when a DC fault occurs, a reverse voltage can be supplied to block a DC fault current, thereby preventing damage to an IGBT, a diode, and a capacitor. In addition, since a voltage of the capacitor is prevented from being discharged, quick restarting is possible after removal of the DC fault.

Fourth, as compared with an arm including a full bridge-type module having a DC fault current reducing function, which includes four IGBTs, four diodes, and one capacitor, during a normal state operation, an arm current can flow to a thyristor having low conduction loss instead of an IGBT having high conduction loss, thereby reducing conduction loss.

Fifth, since a capacitor voltage of a sub-module is supplied to a fault current path as a reverse voltage with respect to a voltage caused by a fault through operations of an IGBT and a thyristor during a DC fault, a potential difference between an AC connection point and a DC connection can be rapidly reduced, thereby preventing a DC fault current from flowing.

As described above, it may be understood that the present invention has been implemented as various modified embodiments without deviating from the intrinsic features of the present invention.

Therefore, the exemplary embodiments as described above should be considered not in a limited viewpoint but in an illustrative viewpoint. The scope of the present invention is not limited to the exemplary embodiment described and illustrated above but is defined by the appended claims. It will be construed that the present invention includes all differences which range in the equivalent scope of the claims.

What is claimed is:

1. A modular multilevel converter sub-module having a direct current (DC) fault current blocking function, comprising:
    a normal circuit which includes a first switching element (T1) and a second switching element (T2) connected in series to control the modular multilevel converter sub-module to turn on or off through an on or off operation and a first diode (D1) and a second diode (D2) respectively connected to be parallel to the first switching element (T1) and the second switching element (T2) to offset a counter electromotive force generated in the first switching element (T1) and the second switching element (T2);
    a fault DC current blocking circuit which includes a capacitor (C) connected to the normal circuit in parallel and applies a capacitor voltage ($V_{cap}$) to a DC fault path as a reverse voltage ($V_{Block}$) with respect to a fault voltage ($V_{Fault}$); and
    a bypass circuit which includes a third switch element (T3), is connected to the fault DC current blocking circuit in parallel, and determines an output voltage ($V_{SM}$) and a direction of an arm current ($i_{ARM}$) to provide a DC fault current bypass path when a DC fault current occurs,
    wherein the bypass circuit includes the third switching element (T3), a third diode (D3), a thyristor (TH3), and a fourth diode (D4), wherein the third switching element (T3), the third diode (D3), and the thyristor (TH3) are connected in parallel and connected to the fourth diode (D4), which is connected to the first switching element (T1), in series to form a fault DC current path.

2. The modular multilevel converter sub-module of claim 1, wherein the first switching element (T1), the second switching element (T2), and the third switching element (T3) each include an insulated gate bipolar transistor (IGBT).

3. The modular multilevel converter sub-module of claim 1, wherein, in a case in which the direction of the arm current ($i_{ARM}$) in a normal operation is positive ($i_{ARM}$>0), a current always flows through the third diode (D3) of the bypass circuit, when the first switching element (T1) is switched on, a current flows to the first diode (D1), and the capacitor voltage ($V_{cap}$) of the fault DC current blocking circuit is output, and when the second switching element (T2) is switched on, a current flows to the second switching element (T2), and a sub-module voltage becomes zero.

4. The modular multilevel converter sub-module of claim 1, wherein, in a case in which the direction of the arm current $i_{ARM}$ in a normal operation is positive ($i_{ARM}$>0), when the modular multilevel converter sub-module is turned on, the modular multilevel converter sub-module has a switching state in which the first switching element (T1) is switched on, the second switching element (T2) is switched off, the third switching element (T3) is switched off, and the thyristor (TH3) is switched off, and when the modular multilevel converter sub-module is turned off, the modular multilevel converter sub-module has a switching state in which the first switching element (T1) is switched off, the second switching element (T2) is switched on, the third switching element (T3) is switched off, and the thyristor (TH3) is switched off.

5. The modular multilevel converter sub-module of claim 1, wherein, in a case in which the direction of the arm current ($i_{ARM}$) in a normal operation is negative ($i_{ARM}$<0), a current flows through the third switching element (T3) and the thyristor (TH3), when the first switching element (T1) is switched on, a current flows to the first switching element (T1), and the capacitor voltage ($V_{cap}$) of the fault DC current blocking circuit is output, and when the second switching element (T2) is switched on, a current flows to the second diode (D2), and a sub-module voltage becomes zero.

6. The modular multilevel converter sub-module of claim 1, wherein, in a case in which the direction of the arm current $i_{ARM}$ in a normal operation is negative ($i_{ARM}$<0), when the modular multilevel converter sub-module is turned on, the modular multilevel converter sub-module has a switching state in which the first switching element (T1) is switched on, the second switching element (T2) is switched off, the third switching element (T3) is switched on, and the thyristor (TH3) is switched on, and when the modular multilevel converter sub-module is turned off, the modular multilevel converter sub-module has a switching state in which the first switching element (T1) is switched off, the second switching element (T2) is switched on, the third switching element (T3) is switched on, and the thyristor (TH3) is switched on.

7. The modular multilevel converter sub-module of claim 1, wherein, during a fault operation, a current flows in a negative direction ($i_{Fault}$<0), and when the third switching element (T3) and the thyristor (TH3) are switched off during a fault, a current flows to the fourth diode (D4) and the second diode (D2) so that the capacitor voltage ($V_{cap}$) is applied to the DC fault path as the reverse voltage ($V_{Block}$) with respect to the fault voltage ($V_{Fault}$) to block a fault DC current.

8. The modular multilevel converter sub-module of claim 1, wherein, during a fault operation, the modular multilevel converter sub-module has a switching state in which the first switching element (T1) is switched off, the second switching element (T2) is switched off, the third switching element (T3) is switched off, and the thyristor (TH3) is switched off.

9. A method of controlling a modular multilevel converter sub-module having a direct current (DC) fault current blocking function, which includes a normal circuit which includes a first switching element (T1) and a second switching element (T2) connected in series to control the modular multilevel converter sub-module to turn on or off through an on or off operation and a first diode (D1) and a second diode (D2) respectively connected to be parallel to the first switching element (T1) and the second switching element (T2) to offset a counter electromotive force generated in the first switching element (T1) and the second switching element (T2), a fault DC current blocking circuit which includes a capacitor (C) connected to the normal circuit in parallel and applies a capacitor voltage ($V_{cap}$) to a DC fault path as a reverse voltage ($V_{Block}$) with respect to a fault voltage ($V_{Fault}$), and a bypass circuit which includes a third switching element (T3), a third diode (D3), a thyristor (TH3), and a fourth diode (D4), wherein the third switching element (T3), the third diode (D3), and the thyristor (TH3) are connected in parallel and are connected to the fourth diode (D4) which is connected to the first switching element (T1), in series to form a fault DC current path, the method comprising:

when a fault occurs, switching the third switching element (T3) and the thyristor (TH3) off to allow a current to flow to the fourth diode (D4) and the second diode (D2); and applying the capacitor voltage ($V_{cap}$) to the DC fault path as the reverse voltage ($V_{Block}$) with respect to the fault voltage ($V_{Fault}$) to block a fault DC current.

10. The method of claim 9, wherein, when the fault occurs, the modular multilevel converter sub-module has a switching state in which the first switching element (T1) is switched off, the second switching element (T2) is switched off, the third switching element (T3) is switched off, and the thyristor (TH3) is switched off.

11. The method of claim 9, wherein a modular multilevel converter includes an upper arm and a lower arm which include the modular multilevel converter sub-modules, the third switching element (T3) and the thyristor (TH3) of the modular multilevel converter sub-module of the upper arm are installed in a negative direction to provide a path with respect to a negative upper arm current, and just before the upper arm current becomes negative, the third switching element (T3) of the upper arm is switched on so that a current flows.

12. The method of claim 11, wherein, in order to prevent a diode loop path from being generated due to a current flowing to the thyristor (TH3) of the modular multilevel converter sub-module of the upper arm and the thyristor (TH3) of the lower arm when a DC fault current occurs, while a lower arm current flows in the thyristor (TH3) of the modular multilevel converter sub-module, the upper arm current flows in the third switching element (T3) to allow a fault current to be blocked through a switch-off operation thereof.

13. The method of claim 12, wherein the lower arm current does not flow to the thyristor (TH3) of the modular multilevel converter sub-module of the lower arm from a lower arm current zero crossing point at which the lower arm current becomes positive, and the upper arm current flows to the thyristor (TH3) of the upper arm.

14. The method of claim 13, wherein, after a certain time delay for a margin at the lower arm current zero crossing point, when the thyristor (TH3) of the modular multilevel converter sub-module of the upper arm is switched on, the upper arm current flows to the thyristor (TH3) instead of the third switching element (T3) of the modular multilevel converter sub-module to reduce conduction loss.

\* \* \* \* \*